United States Patent [19]
Fischer et al.

[11] Patent Number: 5,690,455
[45] Date of Patent: Nov. 25, 1997

[54] METAL EXPANSIBLE ANCHOR

[75] Inventors: Artur Fischer, Waldachtal; Dirk Elger, Alpirsbach, both of Germany

[73] Assignee: fischerwerke Artur Fischer GmbH & Co. KG, Weinhalde, Germany

[21] Appl. No.: 745,260

[22] Filed: Nov. 8, 1996

[30] Foreign Application Priority Data

Nov. 8, 1995 [DE] Germany .................. 195 41 564.7

[51] Int. Cl.$^6$ ...................................... F16B 13/06
[52] U.S. Cl. ...................................... 411/55; 411/60
[58] Field of Search ...................... 411/55, 57, 60, 411/54, 71, 44

[56] References Cited

U.S. PATENT DOCUMENTS

| | | | |
|---|---|---|---|
| 4,904,134 | 2/1990 | Fischer | 411/60 |
| 5,176,481 | 1/1993 | Schiefer | 411/60 |
| 5,344,268 | 9/1994 | Fischer | 411/55 |

FOREIGN PATENT DOCUMENTS

| | | |
|---|---|---|
| 3420375A1 | 2/1986 | Germany . |
| 3445713A1 | 6/1986 | Germany . |
| 3730211C2 | 3/1989 | Germany . |
| 4208016A1 | 9/1993 | Germany . |

*Primary Examiner*—Flemming Saether
*Attorney, Agent, or Firm*—Michael J. Striker

[57] ABSTRACT

An expansible anchor for anchoring in a hole drilled in a concrete part has a shaft having a rear end for fastening an article and a front end with a portion of reduced cross-section and an adjoining expander cone; a slide-enhancing sleeve arranged on the shank, an expansible sleeve arranged on the shank and on the slide-enhancing sleeve, the slide-enhancing sleeve being formed as a thin-walled plastic sleeve having a continuous longitudinal slit and arranged on the reduced portion of the shank, the plastic sleeve having a stop edge that abuts the expansible sleeve and formed so that the slide-enhancing sleeve is pushable with the stop edge onto the expander cone when the expander cone is drawn into the expansible sleeve.

6 Claims, 2 Drawing Sheets

METAL EXPANSIBLE ANCHOR

BACKGROUND OF THE INVENTION

The present invention relates to a metal expansible anchor for anchoring in a hole drilled in a building component.

Metal expansible anchors for anchoring in a hole drilled in a building component are known in the art. One of such metal expansible anchors is disclosed in the German patent document DE-OS 34 20 375. The expansible anchor disclosed in this reference has a shank end provided with an expander cone that can be drawn into an expansible sleeve. The expander cone is drawn in in such a manner that a screw arranged at the other end of the shank bears against an article that is to be fastened so that, as a result of rotation, the shank and therefore also the expander cone is displaced axially. The expansible sleeve remains stationary fixed in the drilled hole and is expanded by the expander cone. The expansible segments that are formed by the longitudinal slots of the expansible sleeve are pressed against the wall of the drilled hole.

Such an expansible anchors are used preferably in concrete masonry. If the drilled hole subsequently widens, for example owing to the formation of cracks, it is a requirement that the expansible anchors expand subsequently in order to continue to carry out their holding function reliably. In an expansible anchor that is anchored in a drilled hole, the subsequent expansion behavior is, however, adversely affected by pressing forces between the expander cone and the expansible sleeve. If the expansion forces are sufficiently high, the expansible sleeve may jam against the expander cone.

Another metal expansible anchor has an expander cone that can be drawn into an expansible sleeve as known from the German patent document DE-PS 37 30 211. In order to increase the ability of the expansible sleeve to slide in the region of the expander cone, a closed slide-enhancing ring is arranged in a circumferential groove of the expander cone. As the expander cone penetrates into the expansible sleeve, material is abraded from the slide-enhancing ring and pushed away by the leading edge of the expansible sleeve forwards in such a manner that a low-friction film is produced on the outer surface of the expander cone. The plastic deformation of the slide-enhancing ring during abrasion requires, however, an increased draw-in force that must be applied by correspondingly higher torque. Furthermore, as a result of non-homogeneous areas in the region of the wall of the drilled hole, very often uneven expansion of the expansible segments occurs which result in the expander cone not being coated evenly with a low-friction film. In some places, the low-friction film may be lacking completely so that subsequent expansion at those places occurs only to a limited degree or not at all. Attachment of the slide-enhancing ring in the known expansible anchor also requires higher production outlay.

SUMMARY OF THE INVENTION

Accordingly, it is an object of present invention to provide a metal expansible anchor which avoids the disadvantages of the prior art.

More particularly, it is an object of present invention to provide a metal expansible anchor that can be produced inexpensively and demonstrates subsequent expansion behavior that is effective even in the case of unfavourable assembly conditions.

In keeping with these objects and with others which will become apparent hereinafter, one feature of present invention resides, briefly stated, in an expansible anchor in which the slide-enhancing sleeve is a thin-walled plastic sleeve that has a continuous longitudinal slit and is arranged on the reduced portion of the shank, which plastic sleeve has a stop edge that abuts the expansible sleeve, with which step edge the slide-enhancing sleeve can be pushed onto the expander cone as the expander cone is drawn into the expansible sleeve.

Since the slide-enhancing sleeve is a thin-walled plastics sleeve that has a continuous longitudinal slit and is arranged on the reduced portion of the shank of the expansible anchor, the expansible sleeve thus, for its entire length, rests on the plastics sleeve so that there is no metal contact anywhere. As the expander cone is drawn into the expansible sleeve, the slide-enhancing sleeve bears, by means of the stop edge that is arranged on the slide-enhancing sleeve and that abuts the expansible sleeve, against the expansible sleeve in such a manner that the slide-enhancing sleeve together with the expansible sleeve slides onto the expander cone. That ensures that there is a plastic layer between the expander cone and the expansible sleeve throughout the entire anchoring process. In order also that metal contact cannot occur anywhere during the expansion process, cold-welding and jamming between the expansible sleeve and the expander cone are prevented. As a consequence, the ability of the expander cone and the expansible sleeve to slide in relation to one another and therefore also the subsequent expansion behavior in the event of widening of the drilled hole owing to crack formation are improved.

The stop edge may be formed either by a collar that is arranged at the front end of the slide-enhancing sleeve, against which collar the leading edges of the expansible segments of the expansible sleeve abut, or may be formed by the rearwardly facing end faces of longitudinal ribs that are arranged on the slide-enhancing sleeve, which longitudinal ribs engage in the longitudinal slots of the expansible sleeve. By virtue of the longitudinal ribs and the resulting profiled shape, greater rigidity is also obtained, as a result of which distortion of material, which may occur in some circumstances as the expander cone is drawn in, is avoided.

In order to enable simple assembly of the slide-enhancing sleeve with the expansible sleeve on the reduced portion, two longitudinal ribs are arranged on the slide-enhancing sleeve symmetrically opposite to the continuous longitudinal slit, the continuous longitudinal slit having, the unassembled state, an internal width that corresponds approximately to the diameter of the reduced portion of the shank. As a result thereof, it is possible for the purpose of assembly to insert the slide-enhancing sleeve into the expansible sleeve that is likewise bent into a U-shape and to push the former, together with the latter, sideways onto the reduced portion of the shank. After being pushed on, the expansible sleeve is bent at its two bent-up ends around the portion so that the expansible sleeve holds also the ends of the slide-enhancing sleeve securely on the surface of the reduced portion.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
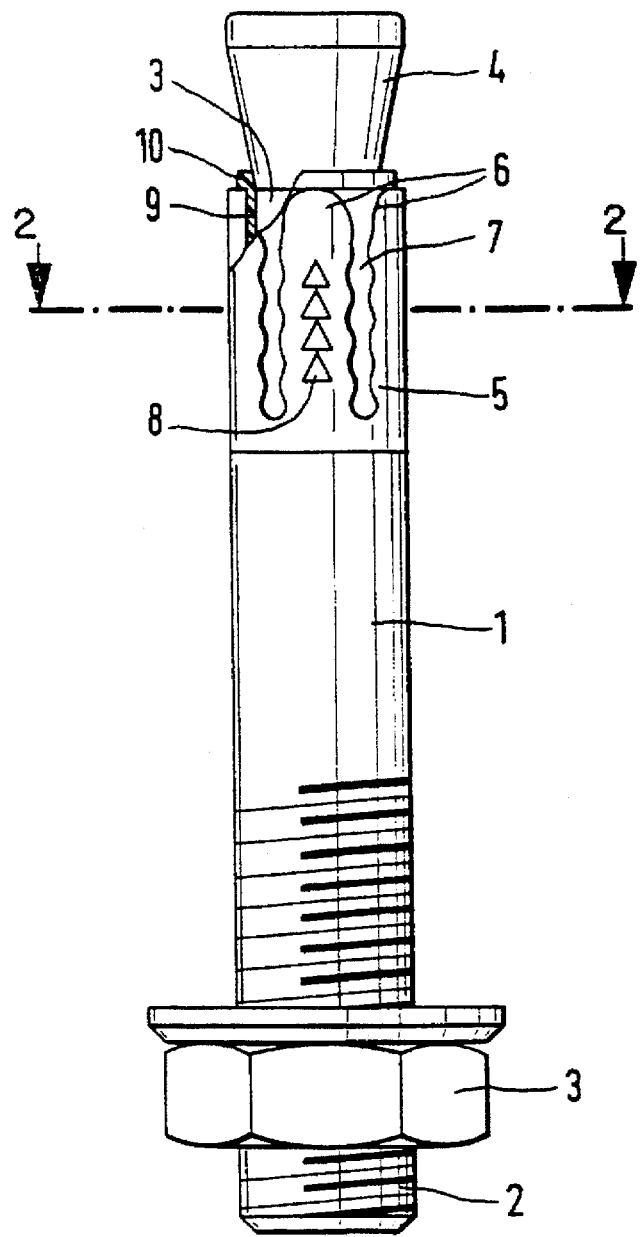
FIG. 1 shows an expansible anchor of the invention having a slide-enhancing sleeve.

An expansible anchor in accordance with the present invention as shown in FIG. 1 has a shank 1 provided at its rear end with a threaded portion 2 having a nut 3. Located in the front region of the shank 1 is a narrowed portion 3, adjoining the front end of which is an expander cone 4. In the region of the portion 3 an expansible sleeve 5 is arranged. Its expansible segments 6 are formed by longitudinal slots 7 that start from the leading edge of the sleeve. For securing the expansible sleeve in the drilled hole, locking elements 8 are arranged on the expansible segments 6. The locking elements 8 are formed by several outwardly stamped portions, adjoining one another, that run in the longitudinal direction of the expansible segments. The locking elements 8 are triangular in shape, with the apices pointing towards the front end of the expansible segments 6.

Figure 2:
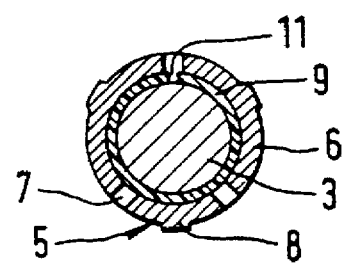
FIG. 2 is a cross-section of the expansible anchor according to FIG. 1 along the section line A—A.

A slide-enhancing sleeve 9 is arranged between the expansible sleeve 5 and the portion 3 and extends over the entire portion 3. The slide-enhancing sleeve 9 has at its front end a stop edge which is formed by a circumferential collar 10. As the expander cone 4 is drawn in, in order to anchor the expansible anchor in a drilled hole in masonry, the slide-enhancing sleeve 9 bears by way of the collar 10 against the leading edges of the expansible segments 6 so that the slide-enhancing sleeve 9 is pushed with the expansible sleeve 5 onto the expander cone 4. There is thus a plastics layer between the surface of the cone and the inner surface of the expansible segments 6 throughout the entire anchoring process, which prevents metal contact between the expander cone 4 and the expansible sleeve 5. Sliding the slide-enhancing sleeve 9 onto the expander cone is facilitated by a longitudinal slit 11 which can be seen in the cross-sectional illustration according to FIG. 2.

Figure 3:
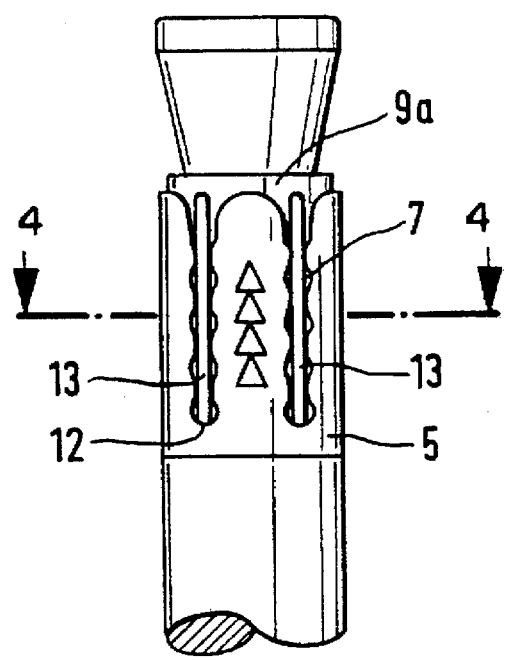
FIG. 3 shows the expansible anchor having a differently constructed slide-enhancing sleeve.

In the slide-enhancing sleeve 9a shown in FIG. 3, the stop edge is formed by the rearwardly facing end face 12 of longitudinal ribs 13 that engage in the longitudinal slots 7 of the expansible sleeve 5. In this embodiment, the longitudinal ribs have parallel-running smooth side faces. If the lateral bounding edges of the longitudinal slots 7 are punched out in corrugated form—as shown in the two embodiments, the lateral faces of the longitudinal ribs 13 may also be of a corrugated shape that matches the contour of the bounding edges.

Figure 4:
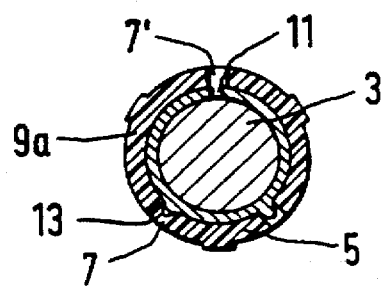
FIG. 4 shows the expansible anchor according to FIG. 3 along the section line B—B.
Figure 5:
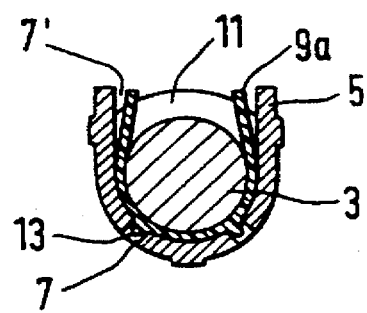
FIG. 5 is a cross-section of the expansible anchor according to FIG. 3 before the expansible sleeve is bent round.

The cross-section along the section line B—B in FIG. 4 shows the longitudinal ribs 13 engaging in the longitudinal slots 7 of the expansible sleeve 5. The two longitudinal ribs 13 are arranged symmetrically opposite to the continuous longitudinal slit 11 of the slide-enhancing sleeve 9a. That enables pre-assembly of the slide-enhancing sleeve 9a according to the illustration in FIG. 5, in which the slide-enhancing sleeve 9a manufactured in the form of a U-shaped plastics injection-molded part is inserted into the likewise U-shaped pre-bent expansible sleeve 5. As a result of the engagement of the longitudinal ribs 13 in the punched-out longitudinal slots 7 of the expansible sleeve 5, pre-locking is produced in such a manner that the continuous longitudinal slit 11 of the slide-enhancing sleeve 9a is aligned with the likewise continuous longitudinal slit 13 of the expansible sleeve 5. Both continuous longitudinal slits are opened so wide that the expansible sleeve 5 together with the slide-enhancing sleeve 9a can be slipped sideways over the reduced portion 3 of the expansible anchor. Thereafter, the two ends of the expansible sleeve 5 that consists of metal are bent together, and the two ends of the slide-enhancing sleeve 9a concomitantly are bent inwards and held.

It will be understood that each of the elements described above, or two or more together, may also find a useful application in other types of constructions differing from the types described above.

While the invention has been illustrated and described as embodied in metal expansible anchor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An expansible anchor for anchoring in a hole drilled in a concrete part, comprising a shaft having a rear end for fastening an article and a front end with a portion of reduced cross-section and an adjoining expander cone; a slide-enhancing sleeve arranged on said shank; an expansible sleeve arranged on said shank and on said slide-enhancing sleeve, said slide-enhancing sleeve being formed as a thin-walled plastic sleeve having a continuous longitudinal slit and arranged on said reduced portion of said shank, said plastic sleeve having a stop edge that abuts said expansible sleeve and formed so that said slide-enhancing sleeve is pushable with said stop edge onto said expander cone when said expander cone is drawn into said expansible sleeve.

2. An expansible anchor as defined in claim 1, wherein said expansible sleeve has a plurality of longitudinal slots forming expansible segments.

3. An expansible anchor as defined in claim 2, wherein said expansible sleeve is provided with locking elements projecting beyond an outer diameter of said expansible sleeve and arranged on said expansible segments.

4. An expansible anchor as defined in claim 1, wherein said expansible sleeve has a plurality of longitudinal slots that form expansible segments, said stop edge being formed as a collar arranged on a front end of said slide-enhancing sleeve so that leading edges of said expansible segments of said expansible sleeve abut against said collar.

5. An expansible anchor as defined in claim 1, wherein said expansible sleeve has a plurality of longitudinal slots forming expansible segments, said slide-enhancing sleeve having a plurality of longitudinal ribs engaging in said longitudinal slots of said expansible sleeve, said stop edge being formed by a rearwardly facing end face of said longitudinal ribs.

6. An expansible anchor as defined in claim 5, wherein said longitudinal ribs include two longitudinal ribs arranged on said slide-enhancing sleeve symmetrically opposite to said continuous longitudinal slit, said continuous longitudinal slit in an unassembled state having an internal width that corresponds approximately to a diameter of said reduced portion of said shank.

* * * * *